(12) United States Patent
Takahashi et al.

(10) Patent No.: US 7,161,467 B2
(45) Date of Patent: Jan. 9, 2007

(54) VEHICLE-MOUNTED DEVICE COMMUNICATION CONTROLLER

(75) Inventors: Jun Takahashi, Miyagi-ken (JP); Ichiro Nakahara, Miyagi-ken (JP); Tetsuya Asada, Kanagawa-ken (JP); Teppei Nagano, Kanagawa-ken (JP)

(73) Assignees: Alps Electric. Co., Ltd., Tokyo (JP); Nissan Motor Co., Ltd., Kanagawa (JP)

( * ) Notice: Subject to any disclaimer, the term of this patent is extended or adjusted under 35 U.S.C. 154(b) by 39 days.

(21) Appl. No.: 10/365,663

(22) Filed: Feb. 12, 2003

(65) Prior Publication Data

US 2004/0090308 A1  May 13, 2004

(30) Foreign Application Priority Data

Feb. 15, 2002 (JP) .............................. 2002-038895

(51) Int. Cl.
*B60R 25/00* (2006.01)
*G05B 19/00* (2006.01)
*G06F 7/00* (2006.01)
*G08B 29/00* (2006.01)
*H04B 1/00* (2006.01)

(52) U.S. Cl. ................. 340/5.7; 340/5.62; 340/825.69; 340/5.6

(58) Field of Classification Search ................. 340/5.7, 340/5.72, 5.62, 825.69, 825.72, 5.61, 5.63, 340/10.1, 10.3, 10.4, 10.5, 426.13, 426.14, 340/426.35, 10.2, 5.6, 5.8
See application file for complete search history.

(56) References Cited

U.S. PATENT DOCUMENTS

| | | | | |
|---|---|---|---|---|
| 4,761,645 A | * | 8/1988 | Mochida | 340/5.62 |
| 5,499,022 A | * | 3/1996 | Boschini | 340/5.62 |
| 5,552,641 A | * | 9/1996 | Fischer et al. | 307/10.5 |
| 5,723,911 A | * | 3/1998 | Glehr | 340/10.5 |
| 5,801,614 A | * | 9/1998 | Kokubu | 340/425.5 |
| 5,844,517 A | * | 12/1998 | Lambropoulos | 341/176 |
| 5,945,906 A | * | 8/1999 | Onuma | 340/5.62 |
| 6,317,035 B1 | | 11/2001 | Berberich et al. | |
| 6,549,116 B1 | * | 4/2003 | Honda et al. | 340/5.61 |
| 6,633,227 B1 | * | 10/2003 | Schmitz | 340/10.31 |
| 6,747,546 B1 | * | 6/2004 | Hikita et al. | 340/10.31 |

FOREIGN PATENT DOCUMENTS

| | | |
|---|---|---|
| DE | 198 41 514 | 4/1999 |
| EP | 0 765 984 | 4/1997 |

(Continued)

*Primary Examiner*—Brian Zimmerman
*Assistant Examiner*—Nam Nguyen
(74) *Attorney, Agent, or Firm*—Brinks Hofer Gilson & Lione (57) ABSTRACT

A vehicle-mounted device communication controller includes a vehicle-mounted unit for communicating with ID-registered portable units, a switch-detection mechanism for detecting pressing of an operation knob, a switch-operation restriction mechanism for restricting the rotation of the knob, and a door-opening/closure detection mechanism for detecting opening and closure of a door. Signals are exchanged between the vehicle-mounted unit and each portable unit, and a portable unit having succeeded in exchanging the signals is authenticated and released from the restriction. The vehicle-mounted unit includes a sending/receiving part, a controller, an authentication part, and an ID-storage part. When the door-opening/closure detection mechanism detects opening and then closure of the door, the controller performs the search by an all search method, and only when the latest authenticated ID is stored in the ID-storage part, performs the search by an urgent search method using a simple response signal which does not include an ID.

7 Claims, 8 Drawing Sheets

FOREIGN PATENT DOCUMENTS

| | | |
|---|---|---|
| EP | 0 905 337 | 3/1999 |
| EP | 0 955 217 | 11/1999 |
| EP | 1 142 764 | 10/2001 |
| GB | 2 307 514 | 5/1997 |

\* cited by examiner

VEHICLE-MOUNTED DEVICE COMMUNICATION CONTROLLER

This application claims the benefit of priority to Japanese Patent Application 2002-038895, filed on Feb. 15, 2002.

BACKGROUND OF THE INVENTION

1. Field of the Invention

The present invention relates to a vehicle-mounted device communication controller, and more particularly to a vehicle-mounted device communication controller in which when operating an operation knob having a security function and operable to be pressed and rotated, a strange feeling and an easy feeling at an operation-knob operation time are removed by making the release time of the security function early.

2. Description of the Related Art

Conventionally, for vehicle-mounted device communication controllers which are used mounted in automotive vehicles, the controllers having both a passive keyless entry function and a smart-engine-starter function have been known. A vehicle-mounted device communication controller of this type is provided with a vehicle-mounted unit, and the communication using radio signals is performed between the vehicle-mounted unit and one or more portable unit to be carried by the user. The communication at this time is such that the vehicle-mounted unit sends a low-frequency radio signal of low power to each of the portable units as a search signal intermittently, when any one of the portable units receives this search signal, the received portable unit sends back a response signal, and when the vehicle-mounted unit receives this response signal, the communication is established between the vehicle-mounted unit and the portable unit. Then when the communication is established between the vehicle-mounted unit and the portable unit, the vehicle-mounted unit authenticates the portable unit, which is the communication opponent, that the portable unit is an ID registered normal portable unit. After such an authentication is performed, in the vehicle-mounted device communication controller, the passive keyless entry system changes the setting of the door-locking mechanism from a lock state to an unlock state in order to enable the user and the like to open the door freely. Also, the smart-engine-starter changes the setting of the engine start operation from a prohibited state to a release state, thereby making it possible to start the engine freely.

In this case, the communication between the vehicle-mounted unit and the portable unit continues after the settings of the passive keyless entry and the smart engine starter have been changed. By the communication thereafter, checking is performed whether the portable unit stays within a predetermined range, or the unit stays in the vehicle.

In order to achieve both functions of the passive keyless entry and the smart engine starter, a well known vehicle-mounted device communication controller performs those functions using the common portable units and by the common communication process.

However, in the vehicle-mounted device communication controller, when carrying out such a communication process, a trouble of the operation sometimes arises as described below depending on the structure of the smart engine starter.

In general, in an ignition system using a conventional mechanical key, by inserting a mechanical key into a key cylinder and by rotating the key at the position, the position of the key is changed to an ACC-ON position and to an operable position of the engine starter. However, recently, as an advanced technical means, an engine starter, in which an operation knob is pressed and then rotated to start engine using an operation knob operable to be pressed and rotated in place of an engine starter in which a mechanical key is used to be inserted in the key cylinder and rotated to start the engine, has been proposed by the applicant of the present invention. The smart engine starter having such a structure is provided with a security mechanism.

Specifically, a smart engine starter of this type has an operation knob operable to be pressed and rotated, which is connected with a rotatable ignition switch, and, in addition, includes a switch-detection mechanism which detects the pressing state of the operation knob, and a switch-operation restriction mechanism (security mechanism) which restricts and releases the rotation of the ignition switch.

Figure 6:
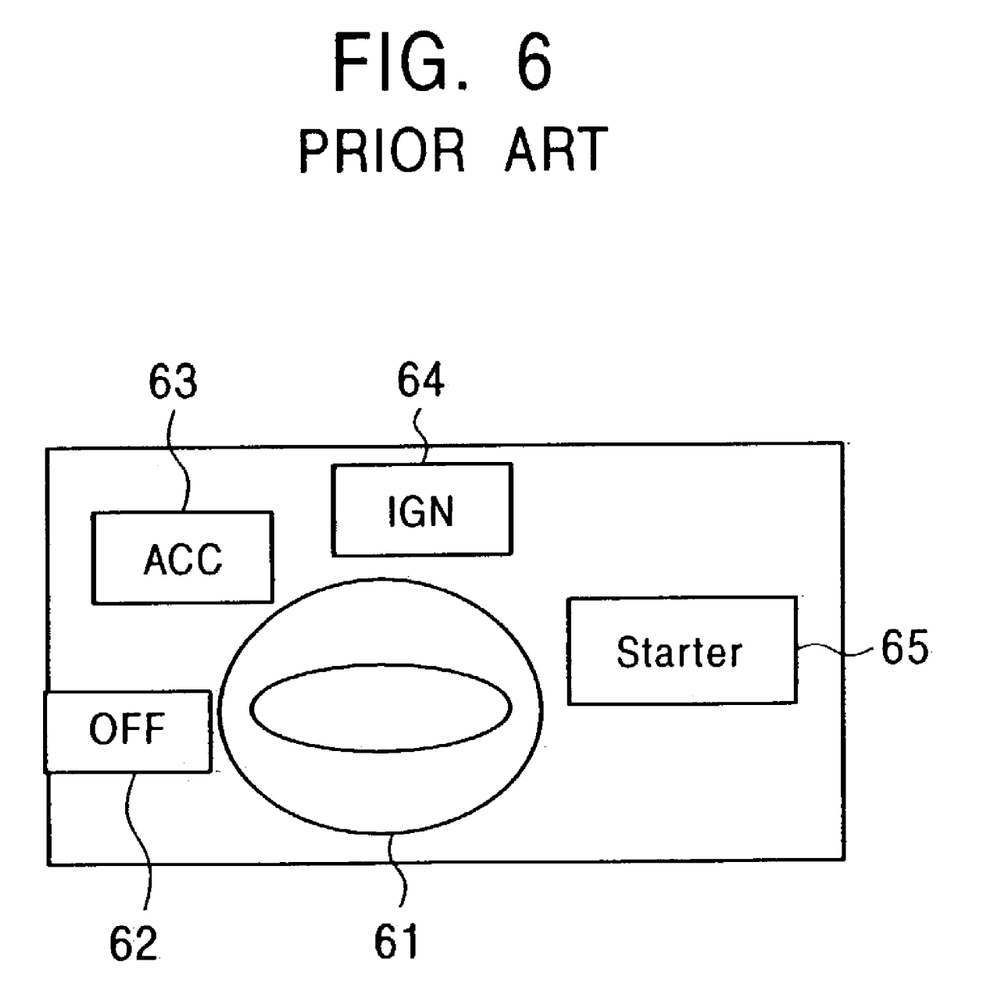
FIG. 6 is a front view illustrating an example of the structure of the external appearance of the smart engine starter which has already been proposed.

FIG. 6 is a front view illustrating an example of the structure of the external appearance of the smart engine starter in the above-described proposal.

As shown in FIG. 6, this smart engine starter has an operation knob 61 connected with a rotation axis of a rotatable ignition switch (not shown in the figure), and the portion around the operation knob 61 has marks indicating a switch-off position (OFF) 62, an accessory-ON position (ACC) 63, an ignition-ON position (IGN) 64, and an engine-start position (Starter) 65.

The operation of the smart engine starter having such a structure is as follows:

The operation knob 61 can always be pressed, however, as long as the switch-restriction mechanism (not shown in the figure) maintains the restriction state, the knob cannot be rotated, and thus the operation knob 61 cannot be rotated to indicate at any one of the accessory-ON position (ACC). 63, an ignition-ON position (IGN) 64, and an engine-start position (Starter) 65. In this state, the operation knob 61 cannot be rotated, and thus the engine cannot be started.

Here, a description will be given of the operations of the vehicle-mounted device communication controller (in the following, simply described as a vehicle-mounted unit) when the user gets in the vehicle and starts the engine step by step.

The communication (in the following, this communication is referred to as a first communication) between the vehicle-mounted unit and the portable unit to be carried by the user is performed, and if the portable unit is determined as a normal portable unit by the means, the setting of the door-locking mechanism is changed to a release state, and thus the user can open the door and gets in the vehicle. At this time, when the door-opening/closure detection switch detects the opening of the door and then the subsequent closure of the door, the communication (in the following, this communication is referred to as a second communication) between the vehicle-mounted unit and the portable unit is performed again. If it is detected that the portable unit is in the vehicle by the second communication, the vehicle-mounted unit determines that the user has got in the vehicle.

Thereafter when the user presses the operation knob 61, and the switch-detection mechanism detects the pressing of the operation knob, the communication (in the following, this communication is referred to as a third communication) between the vehicle-mounted unit and the portable unit is performed by the trigger of the detection. When the third communication is established, the vehicle-mounted unit changes the setting of the switch-operation restriction mechanism from a restricted state up to that time to a release state, and releases the restriction of the rotation operation of the operation knob 61. By this means, the operation knob 61 becomes possible to be rotated freely, thus the operation knob 61 can be rotated to the engine-start position (Starter) 65 through the accessory-ON position (ACC) 63 and the ignition-ON position (IGN) 64, and thus the engine can be started by the operation of the operation knob 61.

Figure 7:
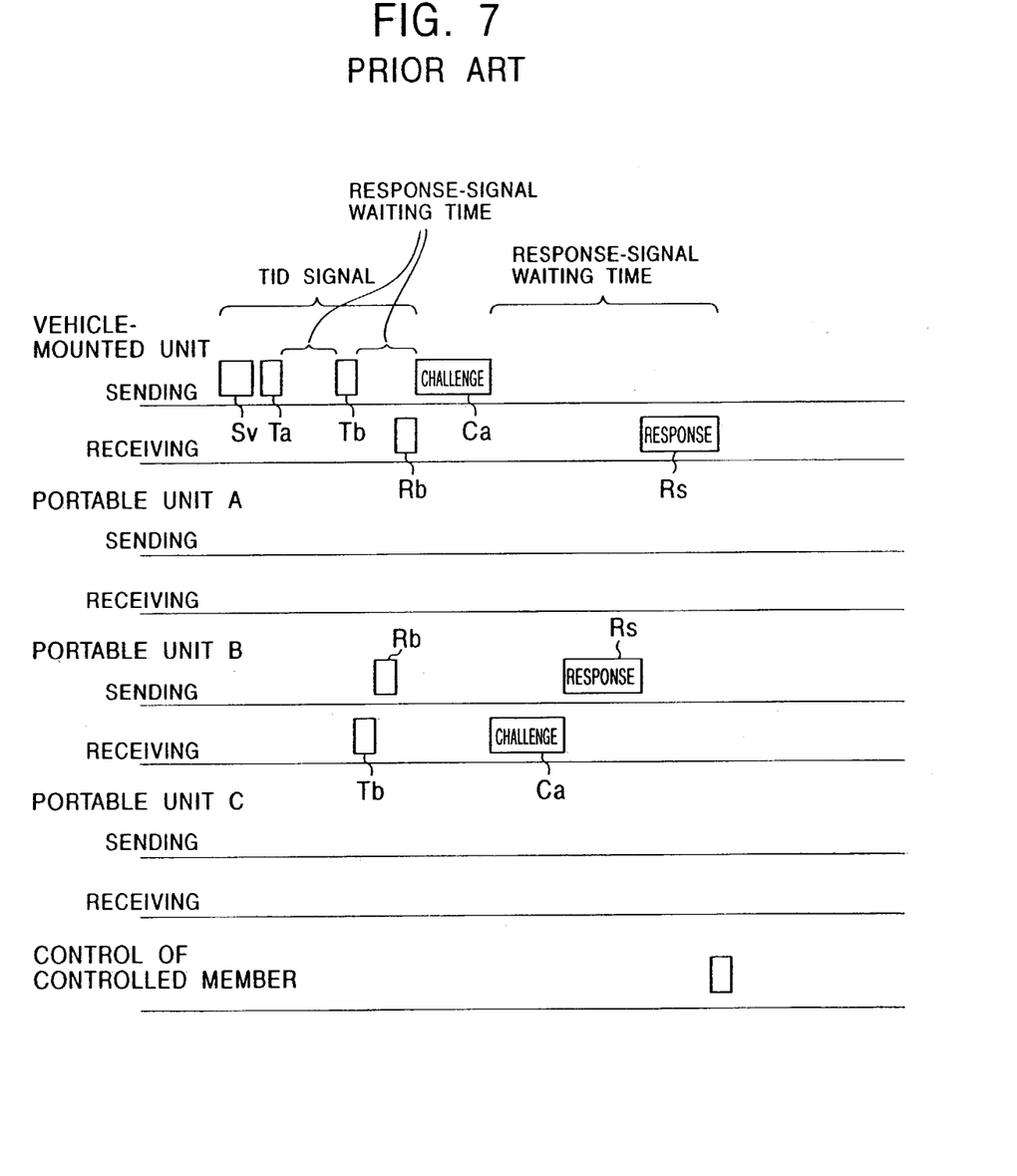
FIG. 7 is a diagram illustrating an example of an operation sequence at a first to a third communication execution time between the vehicle-mounted unit and the portable unit in the smart engine starter which has already been proposed.
Figure 8:
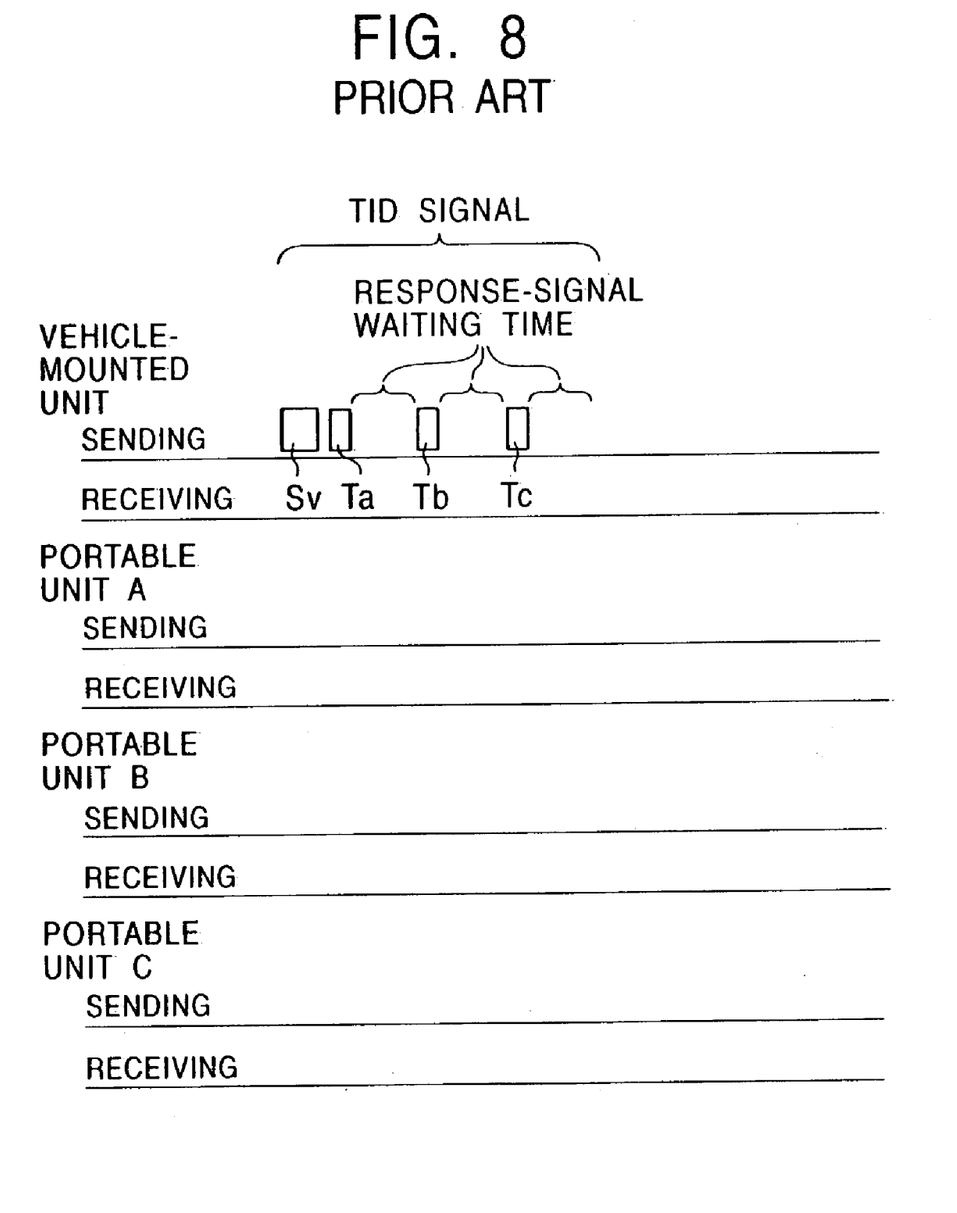
FIG. 8 is a diagram illustrating another example of an operation sequence at a first to a third communication execution time between the vehicle-mounted unit and the portable unit in the smart engine starter which has already been proposed.

Here, FIGS. 7 and 8 are diagrams illustrating examples of operation sequences at a first to a third communication execution time between the vehicle-mounted unit and the portable unit in the smart engine starter in the above-described proposal. FIG. 7 is an example of the case where one portable unit out of a plurality of portable units sends a response signal in response to the sending of a search signal (TID signal), FIG. 8 is an example of the case where none of a plurality of the portable units sends a response signal in response to the sending of a search signal (TID signal), and the plurality of the portable units includes the portable units A, B, and C.

As shown in FIGS. 7 and 8, when performing the first to the third communication, the vehicle-mounted unit sends, at the start of the communication, a all search signal named a all TID signal included a VID signal (Sv) indicating the start of the all search signal and the single pulses (Ta), (Tb), and (Tc) corresponding to the total number of portable units to be searched subsequently at intervals of a predetermined response-signal waiting time.

At this time, as shown in FIG. 7, when the vehicle-mounted unit sends the VID signal (Sv), the single pulse (Ta) for the portable unit A, and the single pulse (Tb) for the portable unit B in sequence, the portable unit B receives the single pulse (Tb) and sends the simple response signal (Rb) in response to it. When the vehicle-mounted unit receives the simple response signal (Rb), the unit stops sending the single pulse (Tc) thereafter, and sends the challenge signal (Ca) for the portable unit B immediately. At this time, when the portable unit B receives this challenge signal (Ca), the portable unit B sends the response signal (Rs) in response to it. When the vehicle-mounted unit receives the response signal (Rs), the vehicle-mounted unit checks the received response signal, authenticates the portable unit based on the check result, and thus the communication between the vehicle-mounted unit and the portable unit B is established. In this regard, the response signal is a signal including an ID fixed for each portable unit.

On the other hand, as shown in FIG. 8, when the vehicle-mounted unit sends the VID signal (Sv), the single pulse (Ta) for the portable unit A, the single pulse (Tb) for the portable unit B, and the single pulse (Tc) for the portable unit C in sequence, and if and the response-signal time has passed, but the response signal is not sent from any of the portable units A, B, and C, sending the search signal is stopped at that time.

In the smart engine starter proposed as described above, when the user pressed the operation knob 61 in order to start the engine, and the switch-detection mechanism detects the pressing of the operation knob 61, the vehicle-mounted unit sends the all search signal (all TID signal). In response to the sending of the single pulse (Tb) of the all search signal (all TID signal), the corresponding portable unit B sends the response signal (Rb) After the vehicle-mounted unit receives this simple response signal (Rb), the vehicle-mounted unit sends the challenge signal (Ca) to the portable unit B. The portable unit B which has received the challenge signal sends the response signal (Rs). The vehicle-mounted unit checks this response signal (Rs) and the communication between the vehicle-mounted unit and the portable unit B is established. It takes about a 200 millisecond (ms) of time for this process. Furthermore, it takes tens of milliseconds (ms) of time from the establishment of the communication to the release of the restriction of the rotation operation of the operation knob 61. The sum total of these time becomes much larger than about 200 millisecond (ms) of time.

On the other hand, in the case of performing a normal operation, the time required from the user's pressing the operation knob 61 to the rotation operation of the operation knob 61 thereafter is shorter than the above-described sum total time. Thus after the user pressed the operation knob 61, the user must wait for a short period of time until the knob becomes rotatable. Therefore the user may have a strange feeling about the operation state of the operation knob 61, may mistakenly consider that a trouble has occurred with the smart engine starter, and may have an uneasy feeling.

SUMMARY OF THE INVENTION

The present invention is made in view of such a technical background, and an object is to provide a vehicle-mounted device communication controller which enables the release of the restriction of the rotation operation of the operation knob to match the operation speed of the operation knob at the time of operating the operation knob of the smart engine starter.

In order to achieve the above-described object, according to the present invention, there is provided a vehicle-mounted device communication controller which includes a vehicle-mounted unit for communicating with a plurality of ID-registered portable units, a switch-detection mechanism for detecting pressing of an operation knob operable to be pressed and rotated, a switch-operation restriction mechanism for restricting the rotation of the operation knob, and a door-opening/closure detection mechanism for detecting opening and closure of a door, and in which a search signal and a response signal are sent and received between the vehicle-mounted unit and each of the portable units, the portable unit having succeeded in exchanging both of the signals is authenticated among the portable units, and the restriction of the switch-operation restriction mechanism is released by the authentication, wherein the vehicle-mounted unit includes a sending/receiving which sends the search signal and receives the response signal, a controller, an authentication part which authenticates the portable unit under the control of the controller, and an ID-storage part which updates and stores a portable unit's ID of the portable unit authenticated at a latest time as a latest authenticated ID, and when the door-opening/closure detection mechanism detects opening of the door, and then detects closure of the door, the controller performs searching by an all search method in which all the portable units are searched in series, and only when a latest authenticated ID is stored in the TD-storage part, the controller performs searching by the urgent search method using a simple response signal which does not include an ID.

By the above-described means, and when the vehicle operator's getting in the vehicle is checked by the door-opening/detection mechanism's detection of the opening of the door and then subsequent closure of the door, the controller searches portable units by the all search method in which all the communication-target portable units are searched in sequence. If the portable unit carried by the vehicle operator is determined to be in the vehicle by the search, the portable unit's ID is updated and stored in the ID-storage part as the latest authenticated ID. When the vehicle operator presses the operation knob operable to be pressed and rotated in order to start the engine thereafter, and the switch-detection mechanism detects the pressing, the controller performs the search by the urgent search method using the simple response signal which does not include an ID. When the fact that the portable unit is in the vehicle is checked again in a short time, the restriction of he switch-operation restriction mechanism is released. Therefore, it becomes possible for the vehicle operator to perform the rotation operation of the operation knob in a short time from starting the operation of the operation knob operable to be pressed and rotated, and thus the vehicle operator does not have a strange feeling about the operation state of the operation knob, and does not have an uneasy feeling at the time of operating the operation knob.

In this case, the all search method is preferably a method in which a all search signal is sent to the all portable units, and when an response signal including the portable unit's ID is received from any one of the portable units, the portable unit is authenticated, and the urgent search method is preferably a method in which a individual search signal is sent to the portable unit having the latest authenticated ID in the ID-storage part, and when a simple response signal not including an ID is received from the portable unit, the portable unit is authenticated.

With this arrangement, as a search method used when searching whether or not the portable unit is in the vehicle, the all search method, which is performed when the vehicle operator gets in the vehicle, takes searching time, but can search the portable unit relatively accurately, and thus authentication of the portable unit in the vehicle is possible with a considerable degree of accuracy at the time of searching the portable unit in the vehicle at the beginning. The urgent search method, which is performed when the vehicle operator starts the operation of the operation knob, is sufficient to search only whether there is the portable unit or not by the portable unit search in a simple format having a short search time, because the authentication of the portable unit in the vehicle has been completed in advance. As a result, it becomes possible to perform the rotation operation of the operation knob in a very short time from an operation-start-point time of the operation knob.

Also, in the above-described means, when the door-opening/closure detection mechanism detects opening of a door and detects closure of the door subsequently, the controller preferably sends the all search signals to all the portable units in sequence as an all search method, when receiving a response signal sent from any one of the portable units portable units, the controller preferably stores the portable unit's ID in the ID-storage part as a latest authenticated ID, at the same time, when a response signal from any one of the portable units cannot be received, the controller preferably changes to the individual search method, preferably sends a individual search signal to the portable unit having the latest authenticated ID stored in the ID-storage part, and preferably determines if the portable unit is in the vehicle depending on whether or not a response signal which does not include an ID is received from the portable unit.

With this arrangement, when updating and storing the latest authenticated ID in the TD-storage part, the searching is performed for all the portable units in sequence using the all search method which can search for the portable unit relatively accurately, and when the communication is established with any one of the portable units by the search using the all search method, the ID of the portable unit can be updated and stored in the ID-storage part as the latest authenticated ID. Together with this, when the communication is not established with any one of the portable units by the search using the all search method, it is determined that the portable unit which is already stored in the ID-storage part as the latest authenticated ID has a high probability of being in the vehicle. For the portable unit, searching is performed by the individual search method in which the portable unit is searched with a high degree of accuracy than the all search method, and checking is performed again whether or not the portable unit is in the vehicle. Thus a determination of whether or not there is a portable unit in the vehicle can be made accurately.

DESCRIPTION OF THE PREFERRED EMBODIMENTS

In the following, an embodiment of the present invention will be described with reference to the drawings.

Figure 1:
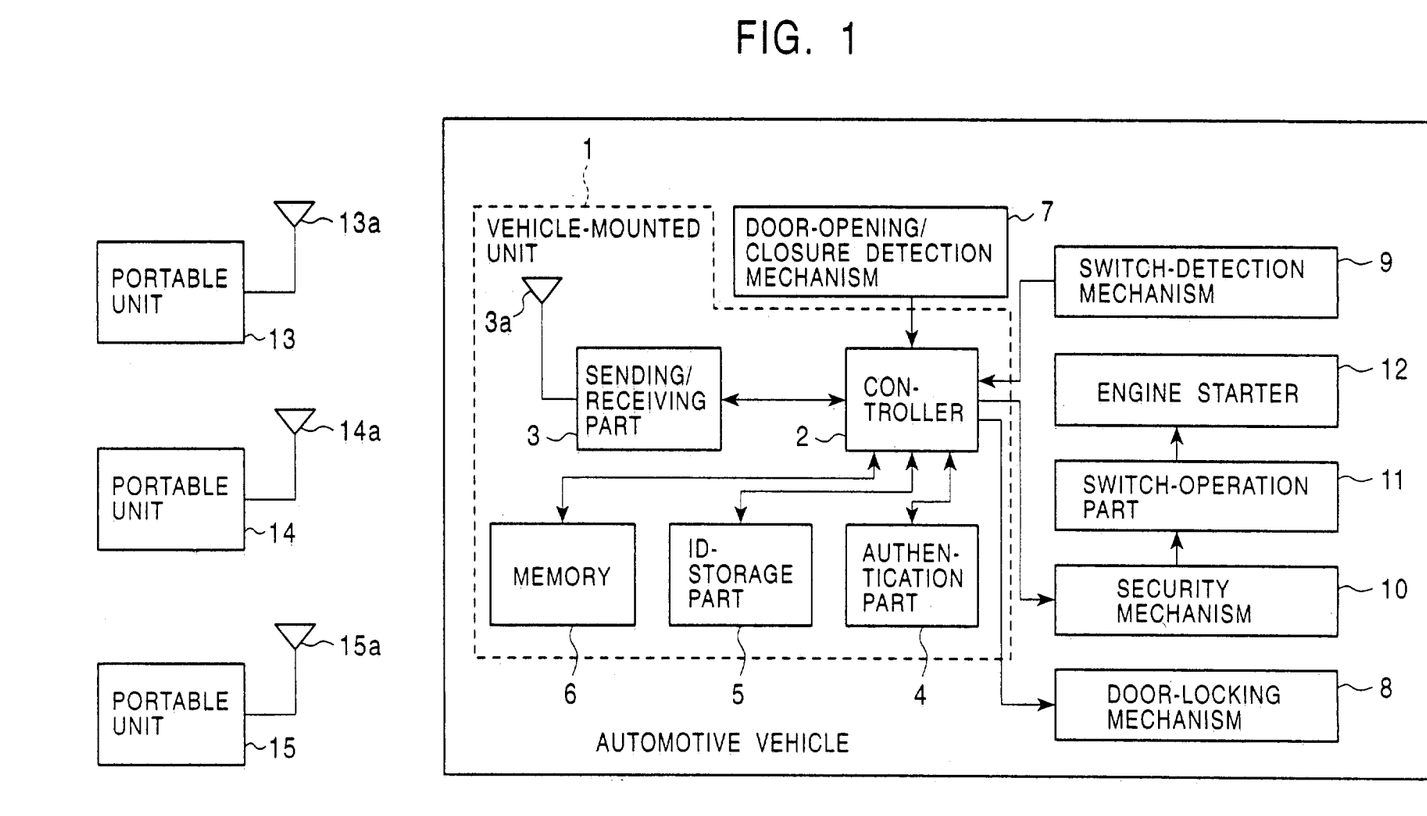
FIG. 1 illustrates a vehicle-mounted device communication controller according to an embodiment of the present invention, and is a block diagram showing the configuration of the essential parts of the controller.

FIG. 1 illustrates a vehicle-mounted device communication controller according to an embodiment of the present invention, and is a block diagram showing the configuration of the essential parts of the controller.

As shown in FIG. 1, the vehicle-mounted device communication controller of this embodiment has a vehicle-mounted unit 1 which is mounted on an automotive vehicle (not denoted by a reference numeral). The vehicle-mounted unit 1 includes a controller 2 which totally controls each part and changes the setting of a search method of a plurality of portable units 13, 14, and 15 described below, a sending/receiving part 3 which includes a sending/receiving antenna 3a and sends search signals and receives response signals, an authentication part 4 which authenticates the portable unit which has established communication, an ID-storage part 5 which updates and stores the latest authentication ID, and a memory 6 in which IDs of the portable units 13, 14, and 15 are registered.

Also, the vehicle-mounted device communication controller of this embodiment includes a door-open/closure-detecting mechanism 7, a door-locking mechanism 8, a switch-detection mechanism 9, a switch-operation restriction mechanism (security mechanism) 10, a switch-operation part (operation knob operable to be pressed or rotated) 11, and an engine starter 12, which are individually installed in a vehicle In addition, the controller includes a plurality of the portable units 13, 14, and 15 each of which internally has the sending/receiving antennas 13a, 14a, and 15a, respectively and is to be carried by the user.

In this case, the door-open/closure-detecting mechanism 7 detects that a door, particularly a vehicle operator's side door, is opened and subsequently the door is closed, and supplies the detection signal to the controller 2. The door-locking mechanism 8 usually holds a door-locking state, but when the control signal is supplied from the controller 2, the door-locking mechanism 8 operates so as to release the door-locking state. The switch-detection mechanism 9 detects the pressing of the operation knob 11 operable to be pressed or rotated, and supplies the detection signal to the controller 2 when detecting the pressing. The switch-operation restriction mechanism 10 usually restricts the rotation operation of the operation knob 11 operable to be pressed or rotated, and operates to release the restriction state when the control signal is supplied from the controller 2. When the restriction state is released, the rotation operation of the operation knob 11 rotates the ignition switch, and the operation knob can be rotated to the desired setting position. The engine starter 12 starts the engine when the operation knob is rotated to the engine-start position.

Figure 2:
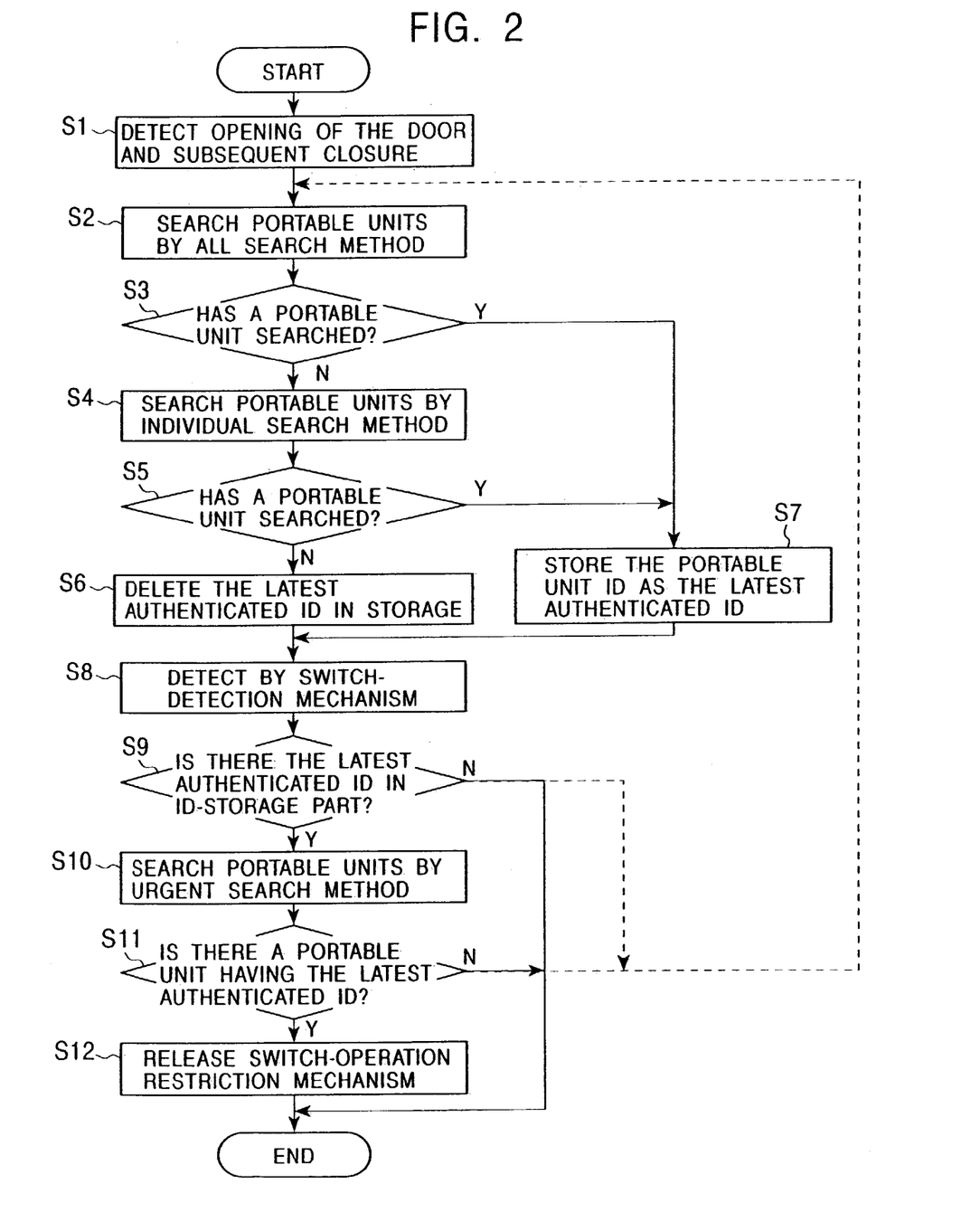
FIG. 2 is a flowchart illustrating an example of an operation process executed in the vehicle-mounted device communication controller shown in FIG. 1.

Next, FIG. 2 is a flowchart illustrating an example of an operation process executed in the vehicle-mounted device communication controller shown in FIG. 1.

A description will be given of the operation of the vehicle-mounted device communication controller according to this embodiment in accordance with the flowchart shown in FIG. 2.

First, in step S1, for example, when the vehicle operator approaches the vehicle with carrying the portable unit 13, or approaches the vehicle and then operates the portable unit 13, the radio-signal communication is carried out between the portable unit 13 and the vehicle-mounted unit 1, and the door-locking mechanism 8 is released by that. At this time, when the vehicle operator opens the locking-released door, the door-detection mechanism 7 detects the opening of the door. When the vehicle operator gets in the vehicle subsequently and closes the door, the door-detection mechanism 7 detects the door closure, and these detection signals are supplied to the controller 2 in sequence.

Next, in step S2, when each detection signal of the door opening and door closure is supplied, the controller 2 searches the portable units by the all search method through the sending/receiving part 3. In this regard, the searching the portable units by the all search method is illustrated in FIGS. 7 and 8, and is the same as the already described known all search method.

Next, in step S3, the controller 2 determines whether or not there is the portable unit 13 in the vehicle from the search result of the portable unit by the all search method performed in step S2. In this regard, when there is no response from any one of the portable units, or when the ID included in the response signal is not an ID of a normal portable unit, the vehicle-mounted unit 1 determines that there is not a portable unit in the vehicle. Then if it is determined that there is not the portable unit 13 in the vehicle (N), the processing goes to the next step S4, whereas if it is determined that there is the portable unit 13 in the vehicle (Y), the processing goes to the other step S7.

Subsequently, in step S4, since the controller 2 has failed to search any portable unit by the search of the portable unit using the all search method, the controller searches the portable units by the individual search method following it. In this regard, a description will be given of this individual search method later.

In the subsequent step S5, the controller 2 determines whether or not there is the portable unit 13 in the vehicle from the search result of the portable unit by the individual search method performed in step S4. Then if it is determined that there is not the portable unit 13 in the vehicle (N), the processing goes to the next step S6, whereas if it is determined that the there is the portable unit 13 in the vehicle (Y), the processing goes to the other step S7.

Next, in step S6, since the controller 2 has failed to check that there is the portable unit 13 in the vehicle, if the latest authenticated ID is stored in the ID-storage part 5, the controller 2 deletes the latest authenticated ID, and if the latest authenticated ID is not stored in the ID-storage part 5, the current state is remained as it is.

Also, in step S7, since the controller 2 checked that there is the portable unit 13 in the vehicle, the controller 2 updates and stores the ID of the portable unit 13 in the ID-storage part 5 as the latest authenticated ID. In this case, if the other ID is stored in the ID-storage part 5 as the latest authenticated ID, the other ID is deleted and the ID of the portable unit 13 is newly stored as the latest authenticated ID, whereas if the other ID is not stored in the ID-storage part 5 as the latest authenticated ID, the ID of the portable unit 13 is stored as the latest authenticated ID.

Next, in step S8, when the vehicle operator who has got in the vehicle presses the operation knob 11 in order to start the engine, the switch-detection mechanism 9 detects a switch-on state by the pressing of the switch operable to be pressed and rotated, and the detection signal is supplied to the controller 2.

Subsequently, in step S9, when the detection signal is supplied from the switch-detection mechanism 9, the controller 2 determines whether or not the latest authenticated ID is stored in the ID-storage part 5. Then if it is determined that the latest authenticated ID is stored in the ID-storage part 5 (Y), the processing goes to the next step S10, whereas if it is determined that the latest authenticated ID is not stored in the ID-storage part 5 (N), a series of operations in the flowchart is terminated, or, as shown in a dotted line, the processing goes back to the previous step S2, and the subsequent operations to step S2 are carried out (for example, for a predetermined number of times) repeatedly again.

Next, in step S10, the controller 2 searches the portable units by the urgent search method through the sending/receiving part 3. In this regard, a description will also be given of this urgent search method later.

Next, in step S11, when the searching is performed by the urgent search method, the controller 2 determines whether or not there is the portable unit 13 having the latest authenticated ID stored in the ID-storage part 5. Then if it is determined that, in the vehicle, there is the portable unit 13 having the latest authenticated ID (Y), the processing goes to the next step S12, whereas if it is determined that, in the vehicle, there is not the portable unit 13 having the latest authenticated ID (N), a series of operations in the flowchart is terminated, or, as shown in a dotted line, the processing goes back to the previous step S2, and the subsequent operations to step S2 are carried out (for example, for a predetermined number of times) repeatedly again.

Subsequently, in step S12, when since the controller 2 checked that there is the portable unit 13 in the vehicle, the controller 2 supplies the control signal to the switch-operation restriction mechanism 10 to release the rotation restriction of the operation knob 11. By this means, the vehicle operator can press the operation knob 11 operable to be pressed or rotated, and can perform the subsequent rotation operation, thereby making it possible to start the engine. In this case, the time period required from the start of the pressing of the operation knob 11 by the vehicle operator to becoming the state operable to be rotated is much short as compared with the operation time of the known operation knob of this type.

After this step S12 is carried out, this series of operations in the flowchart is terminated.

Figure 3:
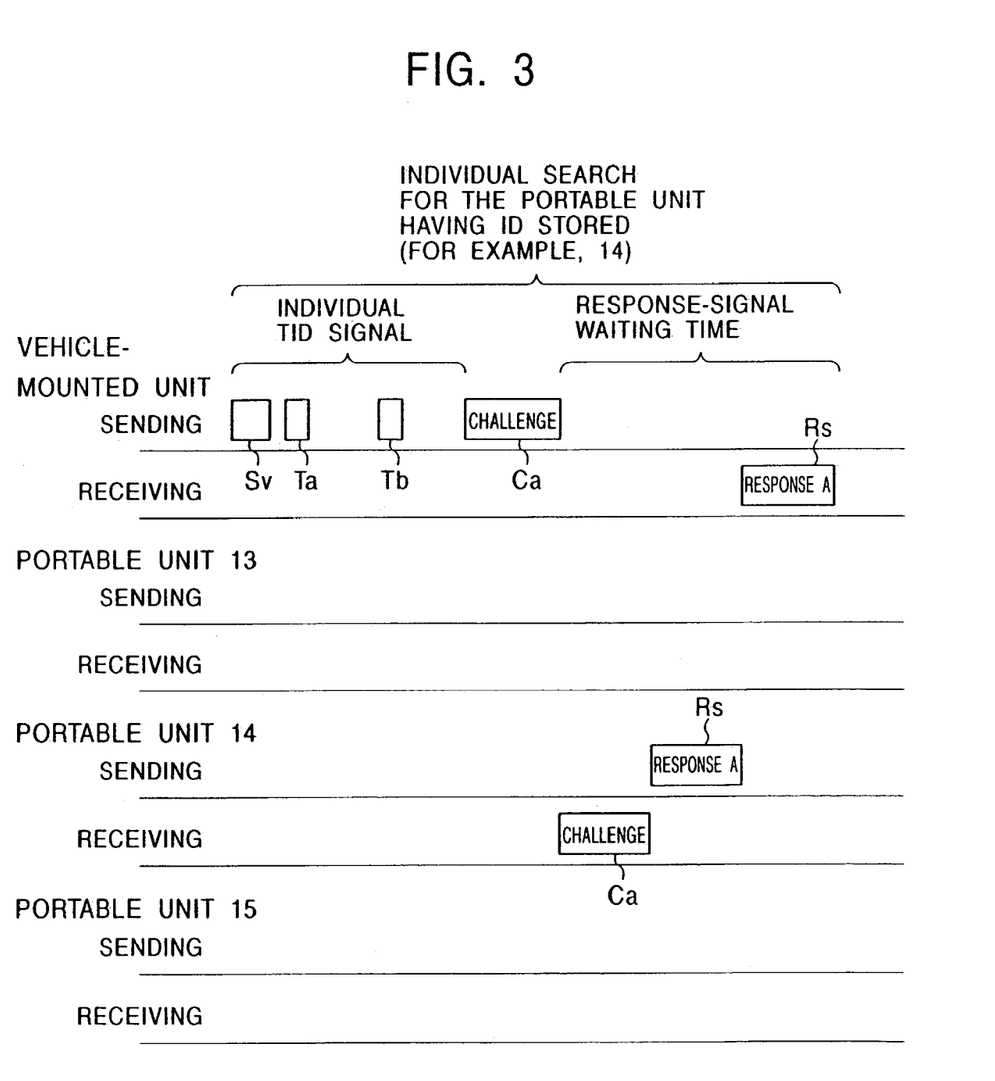
FIG. 3 is a diagram illustrating an example of an operation sequence at a communication execution time between the vehicle-mounted unit and the portable unit in the vehicle-mounted device communication controller shown in FIG. 1.
Figure 4:
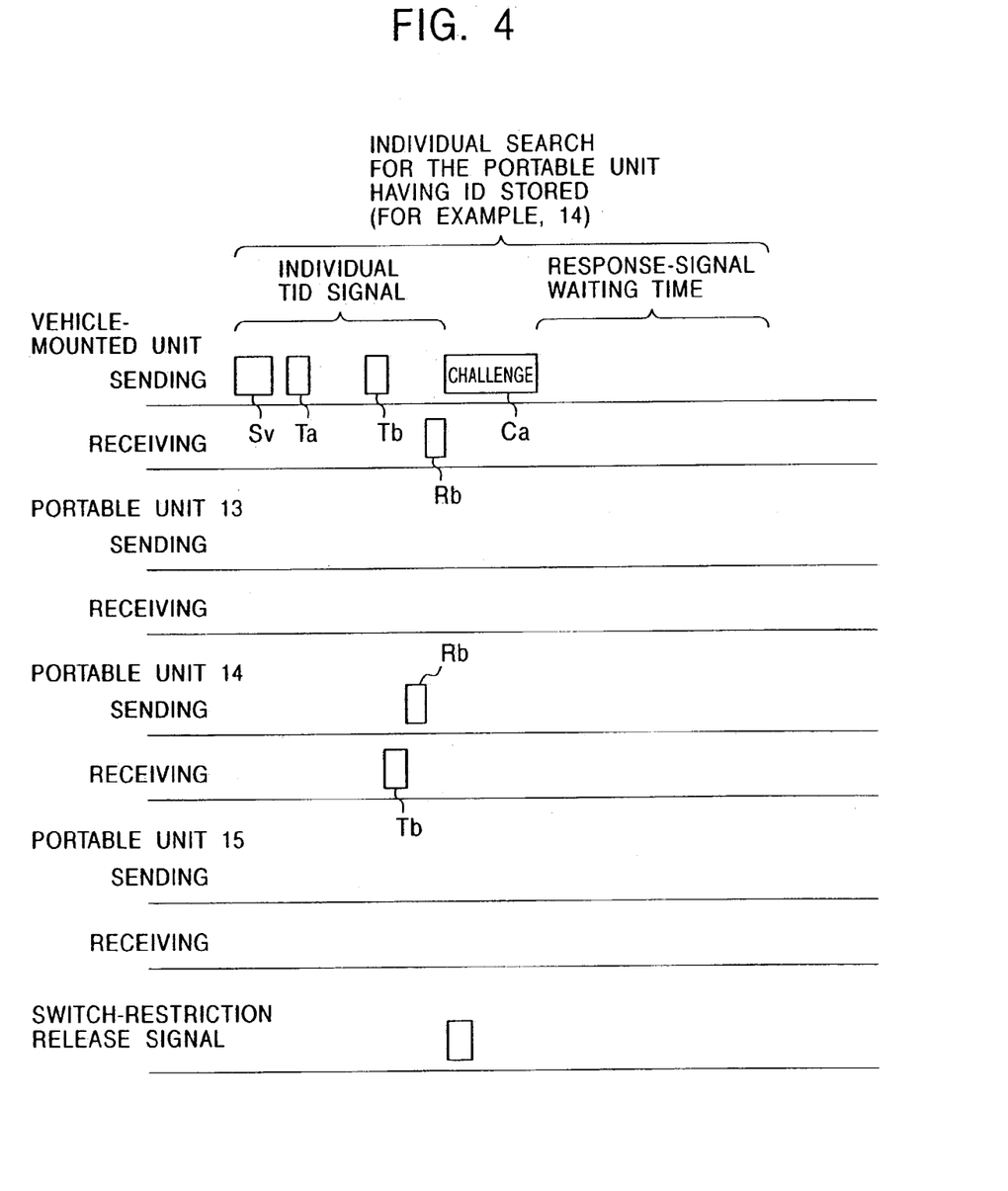
FIG. 4 is a diagram illustrating another example of an operation sequence at a communication execution time between the vehicle-mounted unit and the portable unit in the vehicle-mounted device communication controller shown in FIG. 1.
Figure 5:
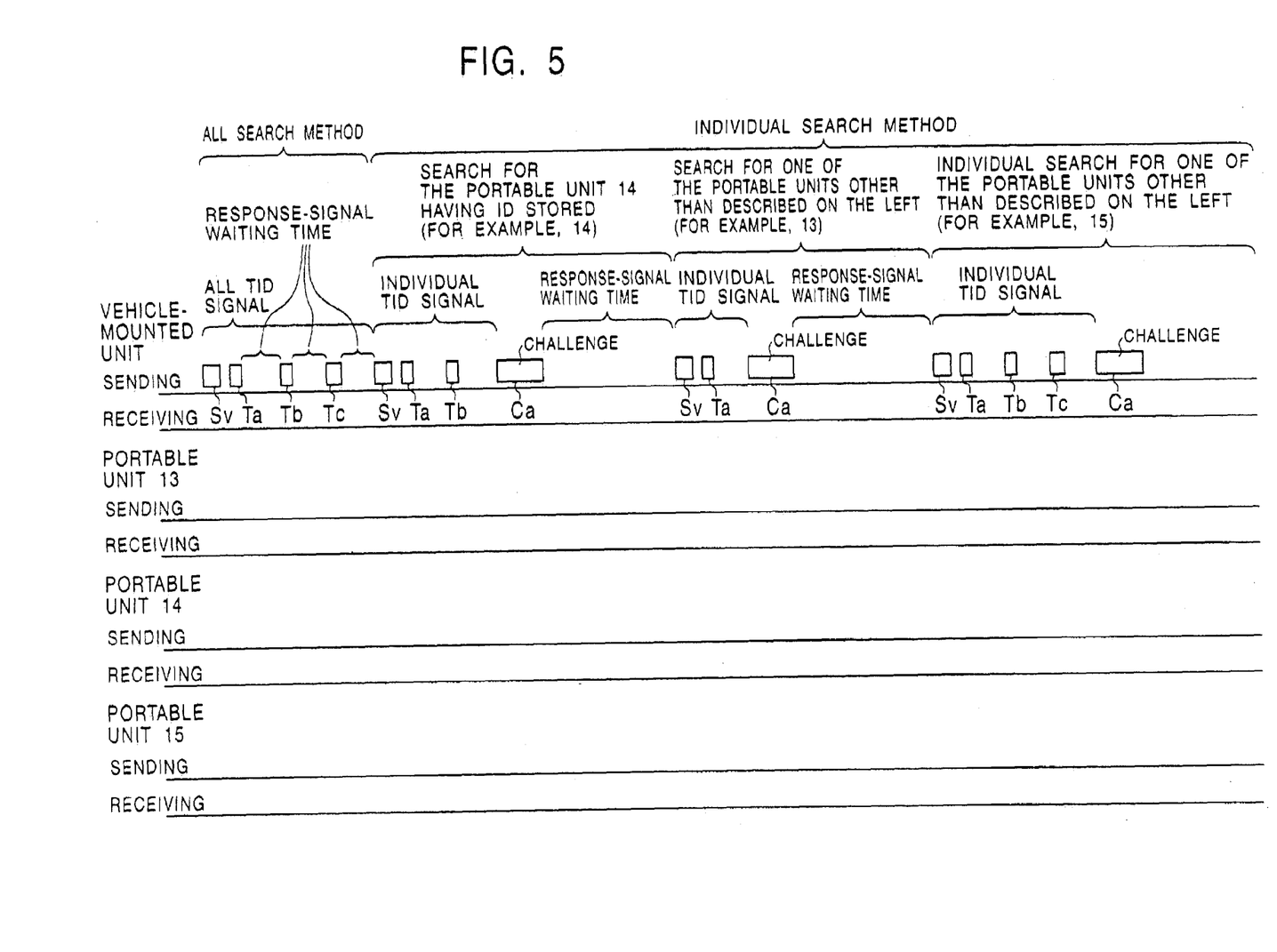
FIG. 5 is a diagram illustrating still another example of an operation sequence at a communication execution time between the vehicle-mounted unit and the portable unit in the vehicle-mounted device communication controller shown in FIG. 1.

Subsequently, each one of FIGS. 3 to 5 is a diagram illustrating each one example of operation sequence at a signal exchanging time between the vehicle-mounted unit and the portable unit by the individual search method and the urgent search method carried out in the vehicle-mounted device communication controller shown in FIG. 1. FIG. 3 is an example of the operation sequence when the individual search method is performed, FIG. 4 is an example of the operation sequence when the urgent search method is performed, and FIG. 5 is an example of the operation sequence when the individual search method is performed following the all search method.

First, a description will be given of the operation sequence, shown in FIG. 3, of the individual search method by which the portable unit in the vehicle is searched. Note that in this example of the operation, the ID of one portable unit, for example, the ID of the portable unit 14 is assumed to be stored in the ID-storage part 5 as the latest authenticated ID.

The vehicle-mounted unit sends, through the sending/receiving part 3, the individual search signal for the portable unit 14 which is arranged the VID signal (Sv), the subsequent single pulse (Ta) and the single pulse (Tb) after the elapse of the time and the challenge signal (Ca) and the elapse of the time as a series of signals. Specifically, the individual search signal (individual TID signal) and a challenge signal (Ca) are sent for the portable unit (here, the portable unit 14) corresponding to the latest authenticated ID stored. At this time, if there is the portable unit 14 in the vehicle, and when the portable unit 14 receives the challenge signal (Ca), the portable unit 14 responds to the receiving the individual search signal and the challenge signal (Ca), and sends the response signal (Rs) immediately. When having received the response signal (Rs), the vehicle-mounted unit checks the ID included in the received response signal (Rs) immediately under the control of the controller 2, and updates and stores the ID of the portable unit 14 in the ID-storage part 5 if the ID is a normal ID.

The above-described operations are related to the search operation of the portable unit 14 in the case where the ID of the portable unit 14 is stored in the ID-storage part 5 as the latest authenticated ID. In the case where the ID of the portable unit 13 is detected to be stored in the ID-storage part 5 as the latest authenticated ID, the search operation for the portable unit 13 which sends the individual search signal included the signal pulse (Ta) and the challenge signal (Ca) for the portable unit 13 is performed. Also, in the case where the ID of the portable unit 15 is detected to be stored in the ID-storage part 5 as the latest authenticated ID, the search operation for the portable unit 15 which sends the individual search signal and the challenge signal (Ca) for the portable unit 15 is performed. The individual search signal includes the signal pulse (Ta), the signal pulse (Tb) and the signal pulse (Tc). In short, the individual search signal according to the present embodiment always outputs the single pulse (Ta), the single pulse (Tb), and the single pulse (Tc) in sequence. When outputting the single pulse (Tb), the single pulse (Ta) and the single pulse (Tb) are output, and when outputting the single pulse (Tc), the single pulse (Ta), the single pulse (Tb), and the single pulse (Tc) are output.

Furthermore, at the time of performing the search operation of the portable unit 14 in the case where the ID of the portable unit 14 is stored in the ID-storage part 5 as the latest authenticated ID, when the individual search signal and the challenge signal (Ca) for the portable unit 14 is sent, and if the response signal (Rs) is not sent from the portable unit 14 after the elapse of the response-signal waiting time, the search operation for the portable unit 13, which sends the individual search signal and the challenge signal (Ca) for the portable unit 13, is performed following the search operation for the portable unit 14. When the response signal (Rs) is sent from the portable unit 13, under the control of the controller 2, the ID of the portable unit 13 is updated and stored in the ID-storage part 5 as the latest authenticated ID. Also, when the response signal (Rs) is not sent even if the search operation for the portable unit 14 and subsequent search operation for the portable unit 13 have been performed, the individual search signal and the challenge signal (Ca) for the portable unit 15 is sent to perform the search operation for the portable unit 15. Also in this case, when the response signal (Rs) is sent from the portable unit 15, the ID of the portable unit 15 is newly updated and stored in the ID-storage part 5 as the latest authenticated ID. If the response signal (Rs) is not sent from the portable unit 15, the ID of the portable unit 14, which has been already stored in the TD-storage part 5 as the latest authenticated ID, is deleted.

Next, a description will be given of the operation sequence, shown in FIG. 4, of the urgent search method in which the rotation restriction of the switch operable to be pressed and rotated is released. Note that also in this example of the operation, the ID of one portable unit, for example, the ID of the portable unit 14 is assumed to be stored in the ID-storage part 5 as the latest authenticated ID.

The vehicle-mounted unit sends, through the sending/receiving part 3, the individual search signal included the VID signal (Sv), the subsequent single pulse (Ta) for the portable unit 13, the single pulse (Tb) for the portable unit 14 after the elapse of the time. At this time, when there is the portable unit 14, and the portable unit 14 receives the single pulse (Tb), the portable unit 14 sends the simple response signal (Rb) which does not include an ID in response to the received single pulse (Tb). When receiving the simple response signal (Rb), the vehicle-mounted unit sends the challenge signal (Ca) for the portable unit 14 immediately, and, at the same time, the controller 2 supplies the control signal to the switch-operation restriction mechanism 10 to release the rotation restriction of the switch operable to be pressed and rotated.

The above-described operations are related to the rotation restriction release operation of the switch operable to be pressed and rotated in the case where the ID of the portable unit 14 is stored in the ID-storage part 5 as the latest authenticated ID. In the case where the ID of the portable unit 13 is stored in the ID-storage part 5 as the latest authenticated ID, after the single pulse (Ta) of the individual search signal for the portable unit 13 is sent, if the simple response signal (Ra) is sent from the portable unit 13, the rotation restriction of the ignition switch is released immediately regardless of the sending time of the challenge signal (Ca) for the portable unit 13. Also, in the case where the ID of the portable unit 15 is stored in the ID-storage part 5 as the latest authenticated ID, after sending the single pulse (Tc) of the individual search signal for the portable unit 15, if the simple response signal (Rc) is sent from the portable unit 15, the rotation restriction of the ignition switch is released.

Finally, a description will be given of the operation sequence, shown in FIG. 5, of the all search method for searching the portable unit in the vehicle and the individual search method which is performed subsequently. Note that also in this example of the operation, the ID of one portable unit, for example, the ID of the portable unit 14 is assumed to be stored in the ID-storage part 5 as the latest authenticated ID.

First, in the all search method performed by the vehicle-mounted unit, through the sending/receiving part 3, the all search signal is sent, in the other ward, the VID signal (Sv) is sent, the subsequent single pulse (Ta) for the portable unit 13 is sent, the response-signal (Ra) waiting time for the single pulse (Ta) elapses, the single pulse (Tb) for the portable unit 14 is sent, the response-signal (Rb) waiting time for the single pulse (Tb) elapses, the single pulse (Tc) for the portable unit 15 is sent, and the response-signal (Rc) waiting time for the single pulse (Tc) elapses. During this time, if any one of the portable units 13, 14, and 15, for example, from the portable unit 14, the response-signal (Rb) is sent, the subsequent single pulse (Tc) and the elapse of the response-signal (Rc) waiting time for the single pulse (Tc) are omitted, and the challenge signal (Ca) for the portable unit 14 is sent. When there is the response signal (Rs) from the portable unit 14, the ID of the portable unit 14 is updated and stored in the ID-storage part 5 as the latest authenticated ID. Also, when any one of the response signals (Ra), (Rb), and (Rc) is not sent form any one of the portable units 13, 14, and 15, the processing changes to the individual search method which is succeeding the all search method.

Next, in the individual search method performed by the vehicle-mounted unit, when the ID of the portable unit 14 is stored in the ID-storage part 5 as the latest authenticated ID, the search operation of the portable unit 14 is performed first. As described above, in the search operation time of the portable unit 14, the individual search signal and the challenge signal (Ca) for the portable unit 14 as a series of signals. At this time, when the portable unit 14 in the vehicle receives the challenge signal (Ca), the portable unit 14 sends the response signal (Rs) in response to it, the vehicle-mounted unit receives the response signal (Rs), and determines that the ID included in the received response signal (Rs) is a normal ID, by the control of the controller 2, the ID of the portable unit 14 is updated and stored in the ID-storage part 5 as the latest authenticated ID, and the individual search method is terminated.

On the other hand, when the response signal (Rs) is not sent from the portable unit 14 at the time of the search operation of the portable unit 14, the search operation for the portable unit 13 is performed subsequently. At the search operation time of the portable unit 13, the individual search signal and the challenge signal (Ca) for the portable unit 13 as a series of signals. At this time, when the portable unit 13 sends the response signal (Rs) in response to this challenge signal (Ca), and determines that the ID included in the received response signal (Rs) is a normal ID by the vehicle-mounted unit, the ID of the portable unit 13 is updated and stored in the ID-storage part 5 as the latest authenticated ID, and the individual search method is terminated.

However, at the time of search operation of the portable unit 13, when the response signal (Rs) is not sent from the portable unit 13, the search operation of the portable unit 15 is performed subsequently. At the search operation time of the portable unit 15, the individual search signal and the challenge signal (Ca) for the portable unit 15 as a series of signals. Also at this time, when the portable unit 15 sends the response signal (Rs) in response to this challenge signal (Ca), and the vehicle-mounted unit determines that the ID included in the received response signal (Rs) is a normal ID, the ID of the portable unit 15 is updated and stored in the ID-storage part 5 as the latest authenticated ID, and the individual search method is terminated. However, if the response signal (Rs) is not sent, the ID of the portable unit 15 is not updated and stored, and the individual search method is terminated.

In this manner, according to this embodiment, the search of whether or not there is a portable unit when the vehicle operator gets in the vehicle is performed by the all search method, and if a portable unit is not found at that time, the search is performed by the individual search method, and thus the search of the portable units is not omitted. Also, when the vehicle operator operates the operation knob in order to start the engine, by the urgent search method based on the latest authenticated ID stored in the TD-storage part 5, a determination is made of whether the portable unit is in the vehicle in a short time, and the rotation restriction of the operation knob 11 connected with the ignition switch is released. Thus it becomes possible for the vehicle operator to perform the rotation operation of the operation knob 11 in a short time from the start of the operation of the operation knob operable to be pressed and rotated. Therefore, the vehicle operator does not have a strange feeling about the operation state of the operation knob 11, and does not have an uneasy feeling when operating the operation knob 11.

As described above, according to the present invention, the vehicle-mounted unit is provided with the ID-storage part which updates and stores only the latest authenticated ID as the latest authenticated ID, and when the door-opening/closure detection mechanism detects the opening of the door and the closure of the door subsequently, and thus the vehicle operator's getting in the vehicle is checked, the controller searches the portable unit by the all search method which searches all the communication-target portable units in series. If the portable unit carried by the vehicle operator is determined to be in the vehicle by the search, the ID of the portable unit is updated and stored in the ID-storage part as the latest authenticated ID. Thereafter when the vehicle operator presses the operation knob operable to be pressed and rotated in order to start the engine, and the switch-detection mechanism detects the pressing, the controller searches by the urgent search method using the simple response signal which does not include an ID, the portable unit is checked again to be in the vehicle in a short time, and the restriction of the switch-operation restriction mechanism is released. Accordingly, it becomes possible for the vehicle operator to perform the rotation operation of the operation knob in a short time from the start of the operation of the operation knob operable to be pressed and rotated. Therefore, there is an effect that the vehicle operator does not have a strange feeling about the operation state of the operation knob, and does not have an uneasy feeling when operating the operation knob.

What is claimed is:

1. A vehicle-mounted device communication controller which includes
a vehicle-mounted unit for communicating with a plurality of ID-registered portable units,
a switch-detection mechanism for detecting pressing of an operation knob operable to be pressed and rotated,
a switch-operation restriction mechanism for restricting the rotation of the operation knob, and a door-opening/closure detection mechanism for detecting opening and closure of a door, and in which a search signal and a response signal are sent and received between the vehicle-mounted unit and the portable units, the portable unit having succeeded in exchanging both of the signals is authenticated among the portable units, and the restriction of the switch-operation restriction mechanism is released by the authentication,
wherein the vehicle-mounted unit includes a sending/receiving part which sends the search signal and receives the response signal, a controller which totally controls each parts, an authentication part which authenticates the portable unit under the control of the controller, and an ID-storage part which updates and stores a portable unit's ID of the portable unit authenticated at a latest time as a latest authenticated ID, and when the door-opening/closure detection mechanism detects opening of the door, and then detects closure of the door, the controller performs searching by an all search method in which all portable units are searched in series and in which a response signal is used which includes an ID, and only when the latest authenticated ID is stored in the ID-storage part, the controller performs searching by an urgent search method using a simple response signal which does not include an ID.

2. A vehicle-mounted device communication controller according to claim 1,
wherein the all search method is a method in which a all search signal is sent to the all portable units, and when an response signal including the portable unit's ID is received from any one of the portable units, the portable unit is authenticated, and the urgent search method is a method in which a individual search signal is sent to the portable unit having the latest authenticated ID in the ID-storage part, and when a simple response signal which does not include an ID is received from the portable unit, the portable unit is authenticated.

3. A vehicle-mounted device communication controller according claim 1,
wherein when the door-opening/closure detection mechanism detects opening of a door and detects closure of the door subsequently, the controller sends an all search signal to all the portable units in sequence as the all search method, when receiving a response signal sent from any one of the portable units, the controller stores the portable unit's ID in the ID-storage part as a latest authenticated ID, at the same time, when a response signal from any one of the portable units cannot be received, the controller changes to a individual search method, sends a individual search signal to the portable unit having the latest authenticated ID stored in the ID-storage part, and determines if the portable unit is in the vehicle depending on whether or not a response signal which does not include an ID is received from the portable unit.

4. A vehicle mounted controller, comprising:
means for communicating with ID-registered portable units, the ID-registered portable units each having a different ID;
means for restricting/enabling rotation of an operation knob, the rotation normally being restricted;
means for authenticating one of the ID-registered units, a signal having been received by the communicating means; and
means for storing the ID of the last authenticated ID-registered unit;
wherein the communicating means communicates with the ID-registered portable units by an all search method or an individual search method, except that a unique search method is used when the ID of the last authenticated ID-registered unit is stored in the storing means; and
providing that the received signal is authenticated by the authentication means, the rotation of the operation knob is enabled by the restricting/enabling means.

5. The vehicle mounted controller according to claim 4, having:
means for detecting pushing the operation knob,
wherein the communicating means communicates with the ID-registered portable units after the detecting means detects pushing the operation knob.

6. The vehicle mounted controller according to claim 5, having:
means for detecting opening and closing of a door,
wherein the communicating means communicates with the ID-registered portable unit after the detecting means detects the opening and the closing of the door.

7. A method of enabling an ignition switch, the method comprising:
detecting the pushing of an operation knob, the operating knob being normally prevented from rotating;
communicating with an ID-registered remote unit;
receiving a signal from the ID-registered remote unit;
authenticating the ID-registered remote unit;
enabling the rotation of the operation knob; and
storing the authenticated ID of the ID-registered remote unit,
wherein the method of communicating communicates with the ID-registered portable units by an all search method or an individual search method, except that a unique search method is used when the ID of the last authenticated ID-registered unit is stored in the storing means.

* * * * *